(12) United States Patent
Kreutzer

(10) Patent No.: US 7,938,405 B2
(45) Date of Patent: May 10, 2011

(54) RADIAL SHAFT SEALING RING

(75) Inventor: Siegmar Kreutzer, Heerlen (NL)

(73) Assignee: VR-Dichtungen GmbH, Ubach-Palenberg (DE)

( * ) Notice: Subject to any disclaimer, the term of this patent is extended or adjusted under 35 U.S.C. 154(b) by 536 days.

(21) Appl. No.: 11/912,305

(22) PCT Filed: Apr. 13, 2006

(86) PCT No.: PCT/DE2006/000661
§ 371 (c)(1),
(2), (4) Date: Jun. 30, 2008

(87) PCT Pub. No.: WO2006/111137
PCT Pub. Date: Oct. 26, 2006

(65) Prior Publication Data
US 2009/0020957 A1    Jan. 22, 2009

(30) Foreign Application Priority Data
Apr. 22, 2005    (DE) .................. 20 2005 006 553 U

(51) Int. Cl.
F16J 15/02    (2006.01)
(52) U.S. Cl. .......................... 277/551; 277/572
(58) Field of Classification Search .......... 277/551, 277/572, 573, 576–577
See application file for complete search history.

(56) References Cited

U.S. PATENT DOCUMENTS
3,653,672 A * 4/1972 Felt .................. 277/556
5,163,692 A * 11/1992 Schofield et al. ......... 277/436

FOREIGN PATENT DOCUMENTS
| DE | 3738512 A1 | 5/1989 |
| DE | 19841123 A1 | 4/2000 |
| DE | 20115033 U1 | 1/2002 |
| GB | 2261920 | 2/1993 |
| JP | 2000-161499 | 6/2000 |
| JP | 2000-240805 | 9/2000 |
| JP | 2004-019798 | 1/2004 |

OTHER PUBLICATIONS
Search report—German Patent and Trademark Office, Mar. 2, 2009, cognate application K550287DE.

* cited by examiner

Primary Examiner — Vishal Patel
(74) Attorney, Agent, or Firm — Cahn & Samuels LLP

(57) ABSTRACT

A radial shaft sealing ring, especially for use together with a $CO_2$ containing pressure medium, comprises a membrane body (1) and a supporting body (2). A centering element (5) having a radially outer edge (6) is disposed on the supporting body (2) and is not covered by the membrane body (1). The membrane body (1), on its radially inner end, comprises a tilted sealing lip (11) which faces away from the supporting body (2). The supporting body (2) has an axial bore for the shaft (8) and, opposite the sealing lip (11), a supporting face (13) which slopes towards the wall (12) of the bore. The invention is characterized in that the centering element (5), when the radial shaft sealing ring is fitted in a bearing house (4), can be contacted with the interior of the bearing housing (4) in a press fit and that the angle (α) between the supporting face (13) and the wall (12) of the bore of the supporting body (2) ranges between 45° and 55° in a central plane which includes the axis of the radial shaft sealing ring.

13 Claims, 2 Drawing Sheets

RADIAL SHAFT SEALING RING

Figure 1:
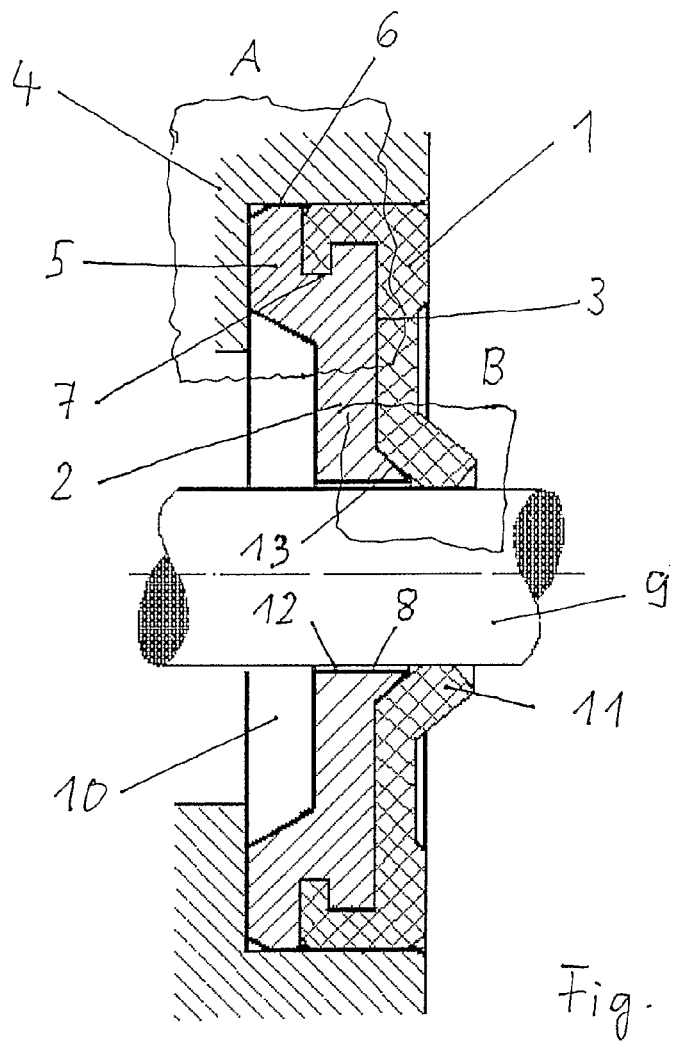

The invention relates to a radial shaft sealing ring, comprising a membrane body and a supporting body, to which the membrane body is fixed, where a centering element having a radially outer edge not covered by the membrane body is located on the supporting body, the radially inner end of the membrane body displays an inclined sealing lip facing away from the supporting body, and the supporting body displays an axial bore for a shaft and, opposite the sealing lip, a supporting face inclined towards the wall of the bore.

Radial shaft sealing rings generally have the task of sealing off shaft passages, thereby preventing media under higher pressure from flowing into spaces having a lower pressure. This is often combined with demands relating to high rotational speeds of the shafts, high temperatures of the medium to be sealed off, chemical resistance, and long service lives.

Radial shaft sealing rings of the kind mentioned in the opening paragraph are known from DE 198 41 123 A1. The centering element of the supporting body disclosed in this publication, which serves to center the supporting body in relation to the bearing housing, can be contacted with the inside of the bearing housing in a very close clearance fit when installing the radial shaft sealing ring in a bearing housing. Relative to the shaft axis, precise, central arrangement of the supporting body in the bearing housing can be achieved by contacting the cylindrical outer edge of the centering element. The gap between the supporting body and the shaft can thus be kept very small.

One special field of application for radial shaft sealing rings is air-conditioning compressors, where the refrigerant used in these compressors imposes special demands on the radial shaft sealing ring. While so-called halons/halogens were used as refrigerants in the past, $CO_2$ is today used as a carrier gas instead, both for reasons of environmental compatibility and because of its more favorable thermodynamic properties, which permit a better refrigerating performance, among other things. However, $CO_2$ has the property of displaying different states of aggregation and large expansions in the operating temperature and pressure range of the compressors from $-30\,C.°$ to $+150\,C.°$. Pressure differences of up to 90 bar can be assumed with this refrigerant. Moreover, consideration must be given to the diffusion properties of $CO_2$, which acts on the radial shaft sealing ring under very high pressure in a mixture with oil in the space to be sealed off.

Use of a highly pressurized $CO_2$/oil mixture in air-conditioning compressors demands very good gas-tightness, both between the supporting body/centering element and the bearing housing, and between the radial shaft sealing ring and the shaft.

The object of the present invention is thus to provide a radial shaft sealing ring that, in particular, optimally fulfils the requirements of a $CO_2$-containing pressure medium.

According to the invention, the object is solved in that, on a radial shaft sealing ring of the kind mentioned in the opening paragraph, the centering element can be contacted with the inside of the bearing housing in a press fit when installing the radial shaft sealing ring in a bearing housing, and the angle between the supporting face and the wall of the bore of the supporting body, lying in a central plane that includes the axis of the radial shaft sealing ring, is between 45° and 55°.

It has become apparent that very good gas-tightness between the radial shaft sealing ring and the bearing housing is achieved as a result of the press fit of the supporting body/centering element, which is not covered by the membrane body, and the bearing housing due to metal-to-metal sealing. Because of the metal-to-metal seal, the $CO_2$ diffusing through the membrane body can only escape between the radial shaft sealing ring and the bearing housing to an extremely small extent, far below all the relevant standards in existence.

It has furthermore become apparent that an angle of the supporting face of the supporting body of between 45° and 55° ensures optimum support of the sealing lip of the membrane body. This results in a relatively undisturbed tribological system with minimal frictional resistance and optimum tightness over the entire range of rotational speeds and pressures, e.g. when operating compressors.

In a preferred development of the invention, the angle of the supporting face of the supporting body is between 48° and 52°.

In an ideal embodiment of the invention, the angle is between 49° and 51°.

It has moreover become apparent that extremely slight extrusion of the elastomeric material of the membrane body into the gap between the supporting body and the shaft is achieved by the radius forming the transition between the supporting face and the wall of the bore of the supporting body, which lies in a central plane including the axis of the radial shaft sealing ring, being between 0.1 and 0.3 mm. In this context, a width of between 0.01 and 0.05 mm, preferably between 0.02 and 0.04 mm, can be assumed to be the most favorable gap width. Particularly with a pressure medium consisting of oil and $CO_2$, major compression of the elastomeric material of the membrane body occurs in the inlet area of the gap between the supporting face of the supporting body and the shaft, without the danger existing of material flowing into the gap, and possibly tearing off. This implies high gas-tightness between the radial shaft sealing ring and the shaft.

The radius of the transition between the supporting face and the bore wall of the supporting body is preferably between 0.1 and 0.25 mm. A radius between 0.1 and 0.2 mm can be regarded as ideal.

In an advantageous development of the invention, the membrane body made of an elastomeric material displays a filler content of between 3% and 7% embedded $MOS_2$ particles.

The filler content is preferably 3% to 5%.

It has become apparent that such a relatively low filler content very largely prevents the lubricant particles from being torn out of the sealing lip of the membrane body, especially at high rotational speeds of the compressors. The lubricant particles lead to deposition of a seal mark on the shaft and impair the gas-tightness between the radial shaft sealing ring and the shaft.

In a further advantageous embodiment of the invention, the membrane body consists of an energy-elastic elastomeric material with a Shore A hardness between 85° and 95°.

The Shore hardness of the membrane body is preferably 90° to 95°.

The energy-elastic elastomeric material of the membrane body reduces the torsional stress or torsion angle of the membrane body at high rotational speeds of the shaft, thus also reducing the wear on the membrane body.

The membrane body is preferably mounted on the supporting body in such a way that it contacts it under prestress.

It is expedient in this context that the membrane body engages a groove on the radially outer side of the supporting body.

In a preferred embodiment of the invention, the centering element of the supporting body is designed in one piece with it.

To ensure optimum precision of the inner and outer radius of the supporting body and the centering element, the supporting body and the centering element can be designed as a one-piece, turned metal part.

Furthermore, on the face end pointing away from the membrane body, the supporting body can display a recess that is radially open towards the inside. The recess is preferably designed as a turned depression in the supporting body, and serves either as a lubricant chamber for the sealing lip behind the pressure support or, in the case of successive seals, as a free space for the inclined sealing lip of the adjacent seal.

In a preferred development of the invention, the face end of the supporting body pointing away from the membrane body transitions into a radially outer area that is axially cranked outwards and forms the centering element.

Figure 2:
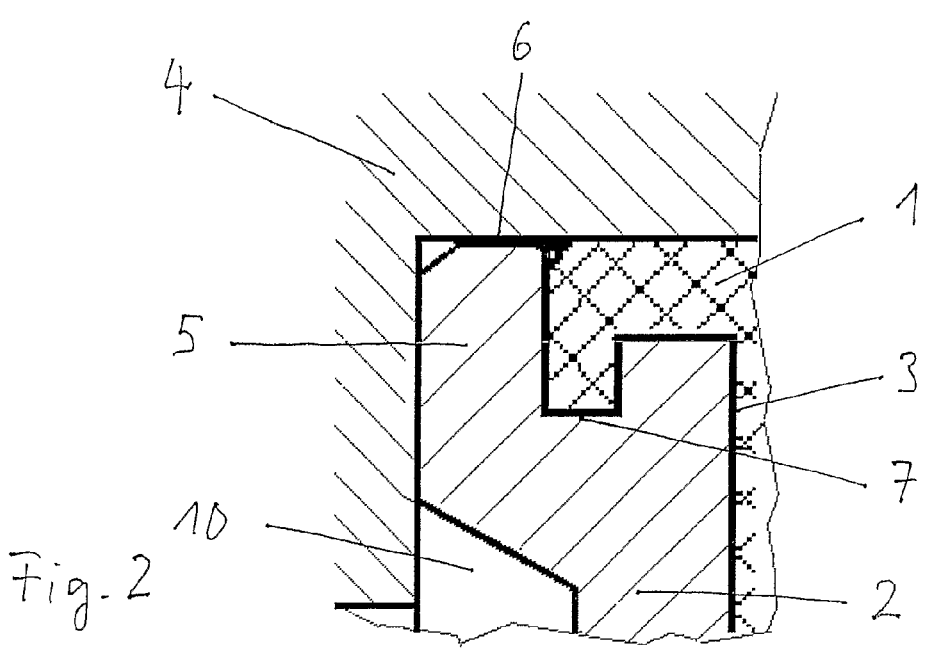
Figure 3:
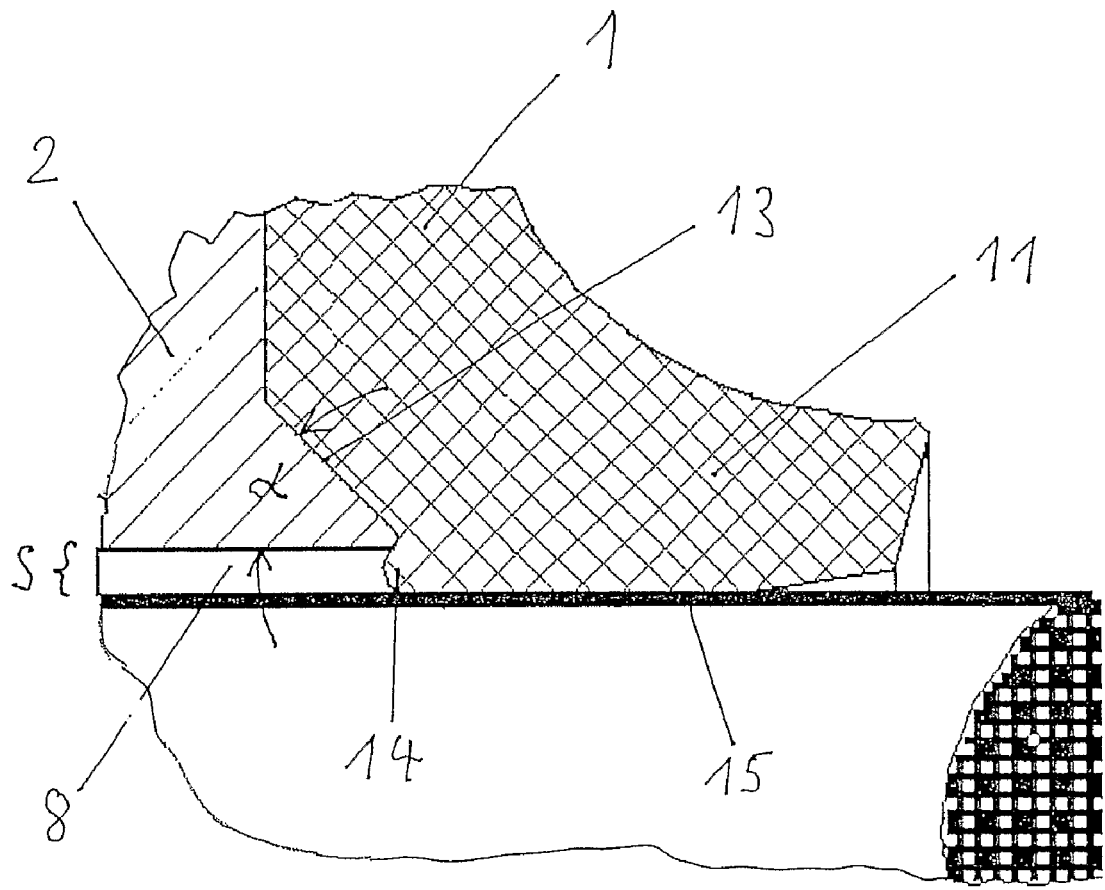

A practical example of the invention is described in more detail below, based on the drawing. The Figures show:

FIG. 1: an axial section through a radial shaft sealing ring inserted in a bearing housing, FIG. 2: an enlargement of area A of the radial shaft sealing ring, framed in FIG. 1, and FIG. 3: an enlargement of area B of the radial shaft sealing ring, framed in FIG. 1.

As apparent from FIG. 1, the radial shaft sealing ring consists of a membrane body 1 and a supporting body 2, on which membrane body 1 is mounted under prestress. Membrane body 1 and supporting body 2 are of essentially disk-shaped design, where membrane body 1 contacts a face end 3 of supporting body 2.

In the arrangement shown in FIG. 1, the radial shaft sealing ring is installed in a bearing housing 4, in that it contacts the inside of bearing housing 4 in a press fit. For centering the radial shaft sealing ring in bearing housing 4 and metal-to-metal sealing against bearing housing 4, supporting body 2 displays a centering element 5 with a radially outer edge 6, which contacts the radially inner side of bearing housing 4 under defined prestress.

Centering element 5 is formed by an outwardly cranked, radially outer area of supporting body 2 on the face end pointing away from membrane body 1. On the axially outer face end of centering element 5, supporting body 2 contacts a radially inward-facing area of bearing housing 4.

Membrane body 1 engages a groove 7 on the radially outer side of supporting body 2, thereby being axially fixed in place relative to it. When not fitted, the radially outward-facing periphery of membrane body 1 projects outwards relative to the radial periphery of centering element 5 not covered by membrane body 1. When the radial shaft sealing ring is press-fitted in a bearing housing 4, the radially outer side of membrane body 1 contacts the radially inward-facing side of bearing housing 4, again under defined prestress.

When press-fitting the radial shaft sealing ring in the bearing housing, centering element 5 achieves exact fixing of the sealing ring in bearing housing 4, the sealing ring being centered extremely accurately relative to the shaft axis. The result of this is that gap 8 between supporting body 2 and shaft 9 displays a uniform size over the entire circumference.

Supporting body 2 and centering element 5 are designed as a one-piece, turned metal part. As a result of the cranking of this part, a recess 10 that is radially open towards the inside is formed on the face end of supporting body 2 pointing away from membrane body 1. The metal-to-metal seal between centering element 5 and bearing housing 4 is best apparent in the enlarged representation in FIG. 2.

As apparent from FIG. 1 and, in an enlarged representation, particularly from FIG. 3, the radially inner end of membrane body 1 displays an inclined sealing lip 11 that points away from supporting body 2. Sealing lip 11 contacts shaft 9 with an axially relatively short surface.

To support sealing lip 11, supporting body 2 displays, on its radially inner end opposite sealing lip 11, a supporting face 13, which is inclined relative to wall 12 of the bore for shaft 9.

Angle $\alpha$ of supporting face 13, i.e. the angle between supporting face 13 and wall 12 of the bore for the shaft, which lies in a central plane including the axis of the radial shaft sealing ring, is 50°+/−2°. It has become apparent that such an angle guarantees optimum support, in that the tribological system is very largely undisturbed over the entire rotational speed and pressure range envisaged for operation of the radial shaft sealing ring, e.g. in a compressor, meaning that optimum tightness is achieved and a relatively low level of frictional resistance maintained.

In order to furthermore achieve the least possible extrusion 14 of the elastomeric material of membrane body 1 in gap 8 in the presence of high material compression in the inlet area of the gap, the radius at the transition between supporting face 13 and wall 12 of the bore of supporting body 2, which is located in a plane including the axis of the radial shaft sealing ring, is 0.15+/−0.05 mm. In this context, gap width s is 0.03+/−0.01 mm. Owing to the high compression of the elastomeric material, the $CO_2$ penetrating into membrane body 1 as a result of diffusion can only enter the gap and escape from the compressor in extremely small quantities, far below the existing standards. The low degree of extrusion 14 at the inlet of gap 8 is illustrated in FIG. 3, in particular.

The elastomeric material of membrane body 1, e.g. HMBR, displays embedded $MOS_2$ particles with a relatively low filler content of 5%+/−2%. This reduces the number of lubricant particles emerging from sealing lip 11 at high rotational speeds of the compressor, and very largely prevents deposition of a seal mark 15 on shaft 9, such that sealing is improved in the area of gap 8.

To avoid wear in the event of excessively high torsional stresses and torsion angles of membrane body 1 at high rotational speeds of the compressor, a relatively energy-elastic elastomeric material with a Shore A hardness between 90° and 95° is used.

LIST OF REFERENCE NUMBERS

1 Membrane body
2 Supporting body
3 Face end
4 Bearing housing
5 Centering element
6 Edge
7 Groove
8 Gap
9 Shaft
10 Recess
11 Sealing lip
12 Wall
13 Supporting face
14 Extrusion
15 Seal mark
$\alpha$ Angle
s Width of the gap

The invention claimed is:

1. Radial shaft sealing ring, comprising a membrane body (1) and a supporting body (2) to which the membrane body (1) is fixed, where a centering element (5) having a radially outer edge (6) not covered by the membrane body (1) is located on the supporting body (2), the radially inner end of the membrane body (1) displays an inclined sealing lip (11) facing away from the supporting body (2), and the supporting body (2) displays an axial bore for the shaft (9) and, opposite the sealing lip (11), a supporting face (13) inclined towards the wall (12) of the bore, wherein the centering element (5) can be contacted with the inside bearing housing (4) in a press fit when installing the radial shaft sealing ring in a bearing housing (4), wherein the angle ($\alpha$) between the supporting face (13) and the wall (12) of the bore of the supporting body (2), lying in a central plane that includes the axis of the radial shaft sealing ring, is between 45 and 55°, and the radius forming the transition between the supporting face (13) and the wall (12) of the bore of the supporting body (2), which lies in a central plane including the axis of the radial shaft sealing ring, is between 0.1 and 0.3 mm, and the gap width (s) between the wall of the bore of the supporting body (2) and the surface of the shaft (9) is between 0.02 and 0.04 mm, and the membrane body (1) has a Shore A hardness between 85 and 95°.

2. The radial shaft sealing ring according to claim 1, where the angle ($\alpha$) between the supporting face (13) and the wall (12) of the bore of the supporting body (2) is between 48° and 52°.

3. The radial shaft sealing ring according to claim 1, where the angle ($\alpha$) between the supporting face (13) and the wall (12) of the bore of the supporting body (2) is between 49° and 51°.

4. The radial shaft sealing ring according to claim 1, where the radius is between 0.15 and 0.25 mm.

5. The radial shaft sealing ring according to claim 1, where the radius is between 0.1 and 0.2 mm.

6. The radial shaft sealing ring according to claim 5, where the membrane body (1) is made of an elastomeric material with a filler content of between 3% and 7% $MOS_2$ particles embedded therein.

7. The radial shaft sealing ring according to claim 5, the filler content is between 3% and 5%.

8. The radial shaft sealing ring according to claim 1, where the Shore A hardness is between 90° and 95°.

9. The radial shaft sealing ring according to claim 1, where the membrane body is mounted on the supporting body (2) and engages a groove (7) on the radial outer side of the supporting body (2).

10. The radial shaft sealing ring according to claim 1, where the centering element (5) is designed in one piece with the supporting body (2).

11. The radial shaft sealing ring according to claim 10, where the supporting body (2) and the centering element (5) are designed as a one-piece, turned metal part.

12. The radial shaft sealing ring according to claim 1, where on the face end pointing away from the membrane body (1), the supporting body (2) displays a recess (10) that is radially open towards the inside.

13. The radial shaft sealing ring according to claim 12, where the face end of the supporting body (2) pointing away from the membrane body (1) transitions into a radially outer area that is axially cranked outwards and forms the centering element (5).

\* \* \* \* \*